Aug. 11, 1942. D. G. SMELLIE Re. 22,158
SUCTION CLEANER
Original Filed Dec. 18, 1936 3 Sheets-Sheet 1
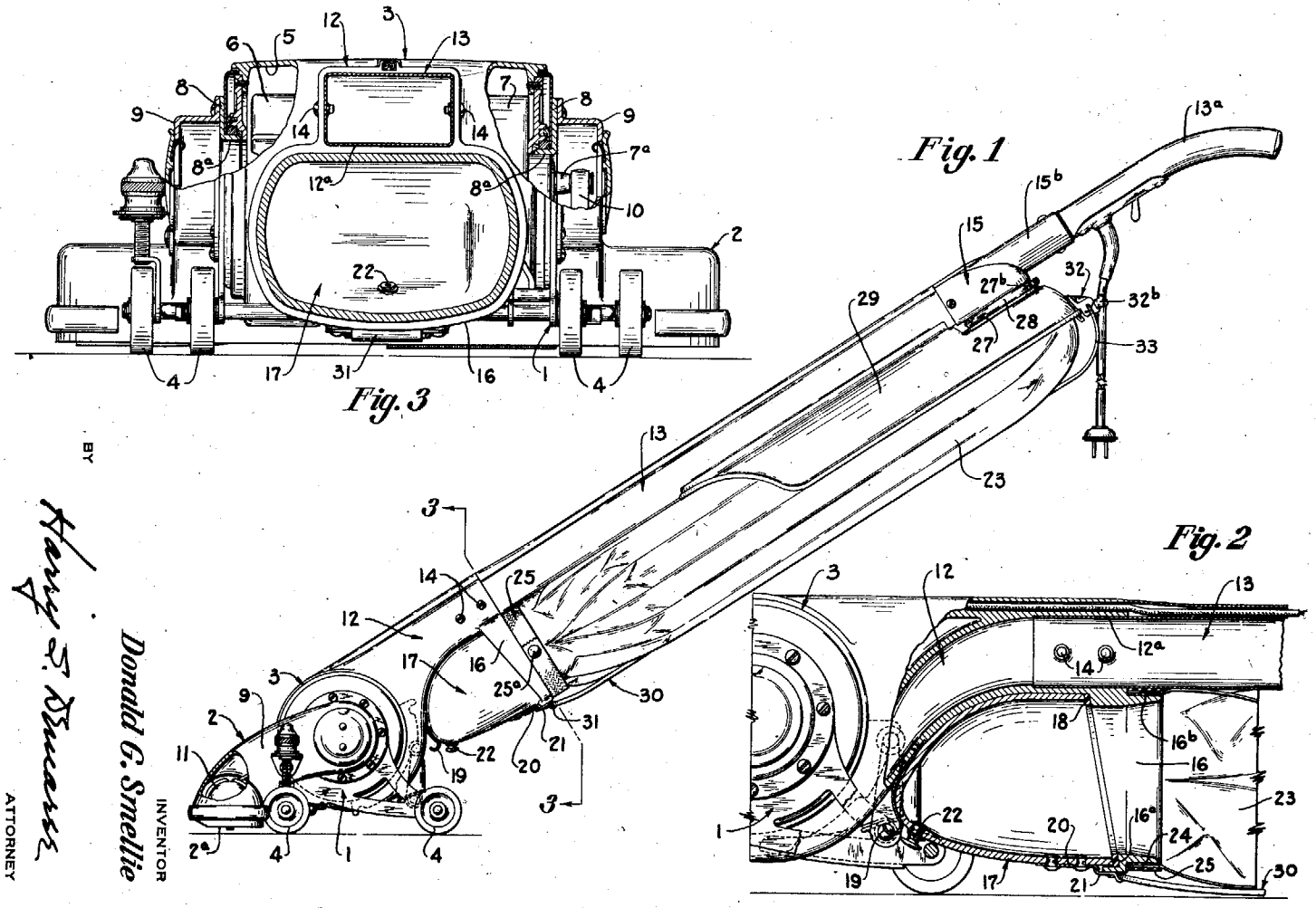
INVENTOR
Donald G. Smellie
BY
Harry F. Dunaway
ATTORNEY Aug. 11, 1942. D. G. SMELLIE Re. 22,158

SUCTION CLEANER

Original Filed Dec. 18, 1936 3 Sheets-Sheet 2

INVENTOR

Donald G. Smellie

BY

Harry S. Drucarse

ATTORNEY

Aug. 11, 1942. D. G. SMELLIE Re. 22,158

SUCTION CLEANER

Original Filed Dec. 18, 1936 3 Sheets-Sheet 3

INVENTOR

Donald G. Smellie

BY

Harry E. Demarest

ATTORNEY

Reissued Aug. 11, 1942 Re. 22,158

UNITED STATES PATENT OFFICE 22,158

SUCTION CLEANER

Donald G. Smellie, Canton, Ohio, assignor to The Hoover Company, North Canton, Ohio, a corporation of Ohio Original No. 2,130,513, dated September 20, 1938, Serial No. 116,515, December 18, 1936. Application for reissue July 24, 1940, Serial No. 347,307

10 Claims. (Cl. 183—52)

This invention relates to improvements in suction cleaners and more particularly to a suction cleaner of the handle-maneuvered, portable type characterized especially by a design in which a casing forming a fan chamber and preferably housing the motor, rotates bodily about a horizontal axis and includes, as an integral part thereof, a handle which is free to swing upwardly and downwardly, and a dirt filtering bag and collecting receptacle carried beneath the handle.

The object of the present invention is to improve upon the so-called rotative fan casing, handle and bag arrangement first, by constructing the dirt receptacle in two sections, namely, an elongated filter bag of paper, cloth or other porous material and a relatively smaller imperforate collecting receptacle adapted for frequent emptying.

A further object of the invention is to provide an arrangement whereby the dirt-laden air enters the dirt receptacle adjacent its upper end rather than at its lower end, as is the more customary arrangement, by using the hollow or tubular handle as an extension of the exhaust passage from the fan chamber and having a suitable connection with the upper end of the dirt receptacle. In this way, the dirt-laden air, entering the upper end of the dirt receptacle, moves in a general downwardly direction eventually to find its way into the imperforate receptacle at the lower end of the filter bag.

Other novel features incident to the accomplishment of the more essential objects of the invention will be referred to in the discussion to follow a brief description of the accompanying drawings in which:

Figure 1 is a general view in side elevation of a suction cleaner embodying the improved features of construction and design;

Figure 2 is an enlarged fragmentary view of the rear half of the fan chamber in side elevation and the exhaust outlet, the lower end portion of the handle and the dirt receptacle being shown in section;

Figure 3 is an enlarged detail view in cross section taken through the dirt receptacle and hollow handle at line 3, 3 of Figure 1;

Figure 5:
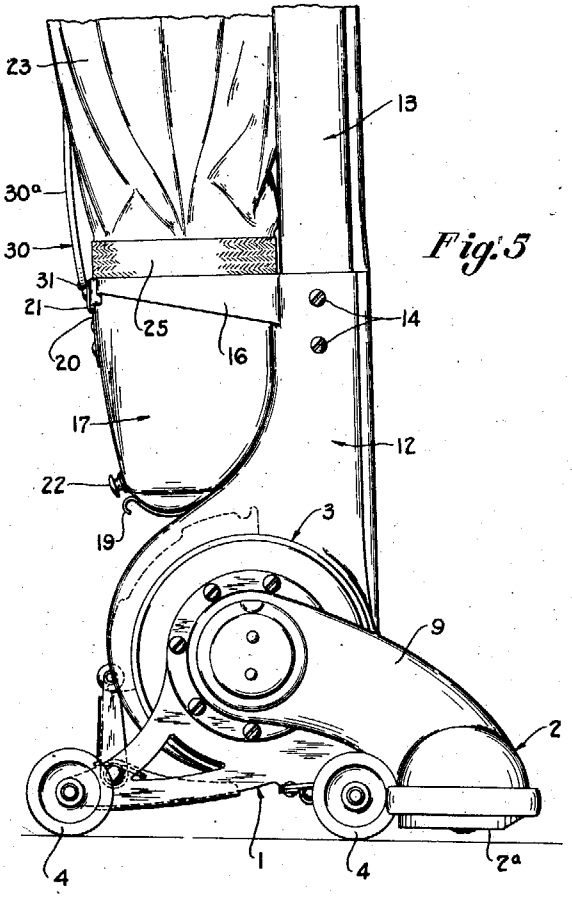
Figure 5 is an enlarged detailed view in side elevation corresponding generally to Figure 1, but with the handle in its vertical position.
Figure 4:
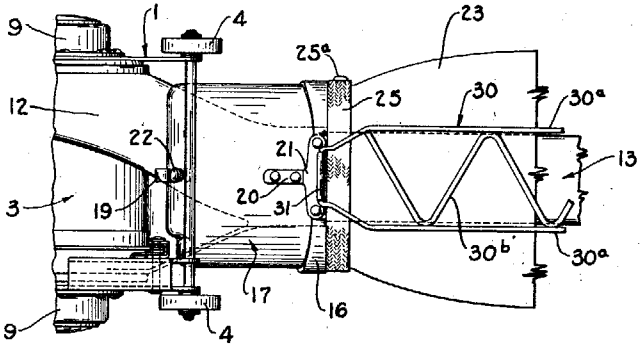
Figure 4 is a fragmentary bottom plan view of the rear portion of the fan casing, the lower portion of the handle and dust receptacle.

Referring to the cleaner in its general aspects, the same comprises a carriage 1 which supports a nozzle casing 2 having a downwardly facing suction mouth. A cylindric casing 3 is also supported upon the carriage 1 for limited rotation about a horizontal transverse axis, and as clearly shown in Figure 1, is located rearwardly of the nozzle casing.

The rotative cylindric casing 3 forms a fan chamber 5 occupying substantially one-half of its length and enclosing a suction fan 6 mounted upon an extension of the armature shaft of the motor 7 housed within the casing adjacent its opposite end. This casing 3 is journalled between two vertical bearing plates 8, 8 forming integral parts of the carriage 1, and having centrally disposed inturned annular flanges 8a, 8a, which provide bearings for the casing 3 and also openings or passageways into the ends thereof.

Located on the outer sides of the end bearing plates 8, 8 are hollow casing sections 9, 9 formed integral with the nozzle 2 and extending rearwardly at right angles therefrom in spaced relation to form passages which enclose the openings at the ends of the rotative casing or housing 3. Thus, as shown in Figure 3, the passage formed by the casing section 9 at the left, connects the nozzle chamber with the fan chamber 5 and forms the inlet passage for the dirt-laden air. The passage formed by the casing section 9 at the opposite end of the casing 3 provides a housing for a driving pulley at the end of the motor shaft 7a and a belt 10 for driving a rotative agitator 11 extending lengthwise of the nozzle immediately above the suction mouth. For the purpose of the present disclosure it will not be necessary to dwell at length on those features of the cleaner thus far described and identified, inasmuch as they are more or less typical of a heretofore known design.

Referring now to those portions of the cleaner associated with the handling of the air discharged from the fan chamber, it will be noted first of all that the discharge or exhaust passage from the fan chamber takes the form of a spiral enlargement 12 starting near the bottom and extending rearwardly and upwardly through an angle of something more than 90 degrees at the rear of the fan chamber and then, swinging outwardly in a reverse curve, terminates in a socket 12a in which is inserted the lower end of a hollow handle 13 and fastened as by bolts 14. This socket and the adjacent length of the handle are preferably rectangular in cross section as shown in Figure 3, with their top surfaces substantially tangential to the upper surface of the cylindric casing 3. The handle 13 is for the most part of a hollow sheet metal construction continuing outwardly toward its free end and maintaining its rectangular cross-sectional contour to a point just short of its extreme outer end, where it terminates in a slightly curved grip portion 13a being socketed in a tubular extension of an attachment fitting 15 for the upper end of the dust bag as will presently be described in detail.

Figure 6:
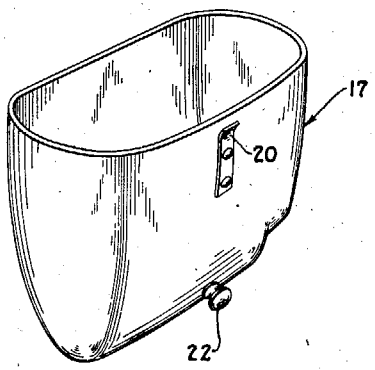
Figure 6 is a perspective view of the imperforate collecting receptacle removed from the lower end of the bag.
Figure 8:
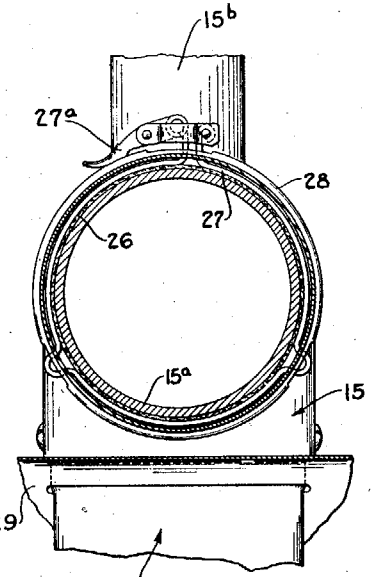
Figure 8 is a detailed view in cross-section through the inlet connection to the bag as taken on line 8, 8 of Figure 7.

Now formed integral with the radially extending outlet connection 12 from the casing 3 and depending therefrom immediately below the handle receiving socket 12a, is an integral ring 16 generally rectangular in shape, but with slightly convex side and bottom wall as clearly shown in Figure 3. This integral ring 16 is spaced some distance outwardly from the rotative casing 3 as well as from the carriage 1 thereby leaving a space therebetween for a dirt collecting receptacle 17, having a large open end conforming to the shape of the supporting ring 16 and tapering to a rounded bottom end as clearly shown in Figure 6. This receptacle is preferably made of a light metal cast or otherwise shaped to fit snugly within the space directly below the outlet connection 12 with its open end fitting tightly into an internal seat 16a around the lower edge of the supporting ring 16 and abutting edgewise against a gasket 18 to provide an air-tight joint. A spring clip 19 riveted to the outlet portion 12 of the rotative casing 3 acts to yieldingly engage the lower rounded end of the receptacle 17 and a pair of overlapping fingers 20 and 21 carried by the receptacle 17 and the supporting ring 16 respectively, act to hold the receptacle to its seat with the aid of the spring clip 19. A knob 22 located near the lower end of the receptacle 17 is provided for facilitating its removal.

Now referring again to the receptacle supporting ring 16 integral with the radially disposed outlet connection 12 from the fan chamber 3, the same also provides a support or mounting for the open end of a light filter bag 23 of any suitable material although preferably of a porous paper. As shown in Figure 1, the bag 23 has the form of an elongated tube closed at its outer end and fashioned into a slightly restricted mouth portion at its lower end, preferably reinforced by a strip 24 applied internally about the mouth opening as clearly shown in Figure 2. The outer edge portion of the supporting ring 16 is preferably reduced in diameter to form an external seat 16b over which the reinforced mouth of the bag 23 may be slipped and held in place by a suitable fastening member such as a flexible band 25 passing around the overlapping edge of the bag mouth and secured by a snap fastener 25a.

The bag 23 extends along the underside of the handle to a point short of the extremity or grip portion thereof and is supported by the fitting 15 which forms the terminal of the hollow conduit forming portion of the handle, as well as a connection between the conduit and a laterally disposed inlet opening adjacent the upper end of the bag 23. Thus as clearly shown in Figure 7, the member 15 has essentially the form of a light metal elbow fitting attached to the end of the rectangular conduit-forming portion of the handle and, making a 90 degree turn in a downward direction, terminates in an annular flange or collar 15a projecting a short distance from the underside of the handle. The fitting 15 also has an integral cylindric extension 15b forming a solid continuation of the handle and provided at its outer end with a socket into which is fitted the grip 13a.

Figure 7:
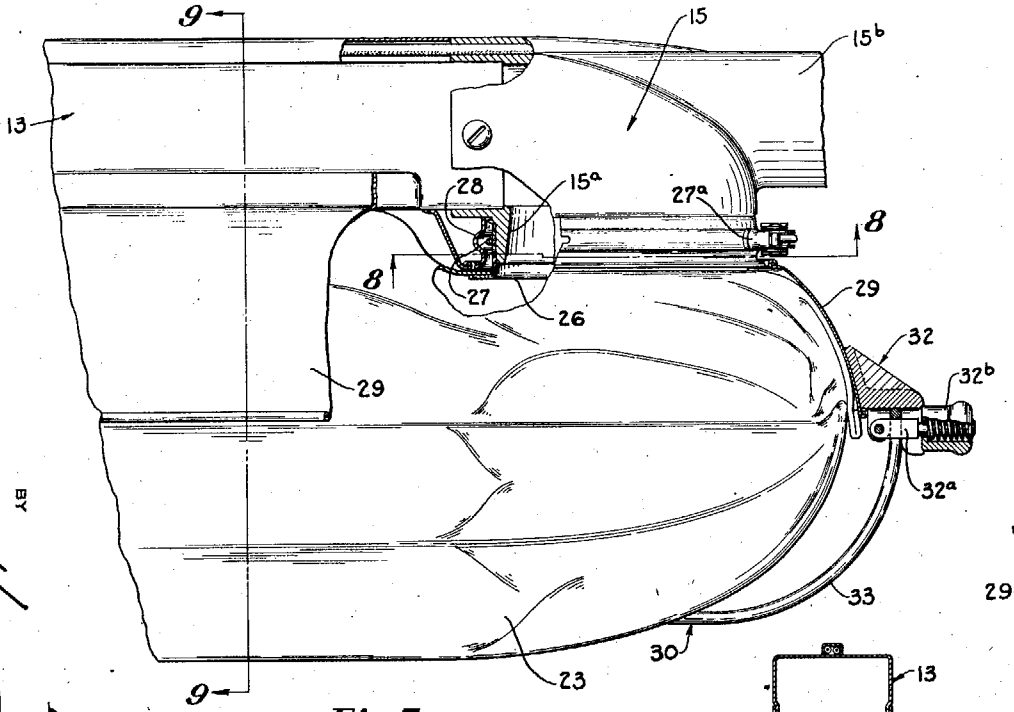
Figure 7 is an enlarged fragmentary view of the upper end of the dirt bag and adjacent portion of the handle showing the inlet connection to the bag.
Figure 9:
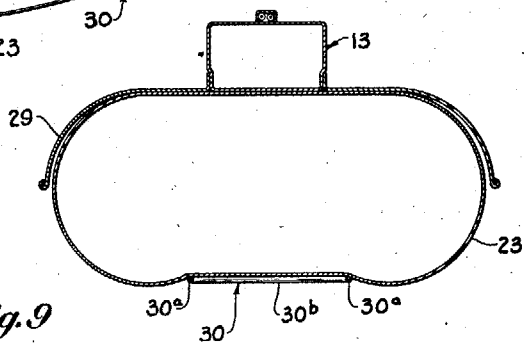
Figure 9 is a cross-sectional view through the handle and bag assembly as taken on line 9, 9 of Figure 7.

The laterally opening inlet at the upper end of the bag 23 is preferably formed by inserting a flanged collar or ring 26 of cardboard or the like into a circular aperture cut in the body of the bag and securing the flanged portion of the ring to the bag material as clearly shown in Figure 7. This ring or collar 26 is adapted to fit over the flange 15a surrounding the outlet opening from the handle fitting 15, and to be detachably clamped in place by a clamping ring 27 supported within a collar-like housing 28 surrounding the flanged outlet of the fitting 15 and suitably carried thereby. By manipulating a suitable clamping lever 27a supported by the clamping ring retaining collar 28 it is a simple matter to apply and detach the inlet end of the bag to the fitting 15 whenever necessary.

To guard the bag against possible damage and undue wear during the operation of the cleaner, certain protective devices are preferably provided, one being a light metal shield 29 secured to the underside of the handle 13 adjacent its outer end portion and shaped to conform to the contour of the upper end portion of the bag. This shield, covering the upper half and end of the bag, is sufficient to protect it against injury from contact with objects from above and along the sides thereof. The other protective member consists of a narrow elongated frame 30 including a pair of spaced parallel rods 30a with a zigzag framework 30b therebetween and having a looped end 33, the lower end being hinged to the underside of the bag supporting ring 16 by means of a hinge 31. The upper end portion of the frame is curved upward through an arc about 90 degrees to conform with the curvature at the end of the bag and fastened at its end in a bracket 32 having a pivoted locking member 32a normally held in locking position by means of a spring pressed knob 32b on the end of the hinged locking member and which when released permits the entire frame to swing downwardly to permit the bag 23 to be removed.

As for the cleaning action of the particular suction cleaner herein disclosed, it differs not essentially from any portable cleaner of the same general type, the only difference being that the dust-laden air is discharged from the fan chamber into the hollow conduit 13 forming the major portion of the handle, thence entering the upper end of the bag 23, the dirt being trapped within the bag and the air passing through the wall thereof. During the operation of the cleaner, the handle and bag assume a position between 30 degrees and 45 degrees to the floor level so that the tendency of the dirt entering the bag 23 is to work its way under the force of gravity toward the lower end of the bag and thence into the removable receptacle 17 at its lower end. Moreover, when the handle is swung into a vertical or storage position, as shown in Figure 5, there is even a greater tendency for the dirt to drop into the receptacle 17, in fact, it would be apparent that by raising the handle to its vertical position from time to time and shaking the bag or tapping its sides lightly such dirt and litter that might adhere to the inner surface of the bag would be dislodged and dropped into the collecting receptacle whereupon the latter would be removed and emptied.

One of the advantages of this arrangement is the elimination of the disagreeable task of detaching and emptying the ordinary cloth dirt bag, for while the present bag has detachable connection at either end so that it can be removed, it serves primarily as a filtering member, and as such can be used for a long period of time providing it is given proper care and attention. In other words, the dirt is collected in the removable receptacle 17, which can be readily removed and emptied without disturbing the bag and without the attending disadvantage of bag emptying.

A further advantage of the arrangement herein disclosed is that of locating the inlet to the bag adjacent its upper end so that the natural progress of the entering dirt particles is from the top toward the bottom and unrestricted by adverse currents of air such as would be set up within the bag were the inlet opening thereto located elsewhere and more particularly at or near its lower end.

Having set forth a preferred embodiment of the invention, I claim:

1. In a suction cleaner, the combination of a fan casing having an exhaust outlet, a hollow handle connected with said casing at said outlet and forming an exhaust conduit, a filter bag mounted beneath said handle and having an inlet adjacent its upper end connected with a downwardly facing outlet opening from the outer end of said conduit, said bag also having a relatively large open mouth at its lower end, a rigid supporting member depending from said casing adjacent said exhaust outlet and detachably supporting said bag mouth in extended position, and a shield carried by said handle and covering the uppermost side and end portions of said bag.

2. In a suction cleaner, the combination of a fan casing having an exhaust outlet, a hollow handle connected with said casing at said outlet and forming an exhaust conduit, a filter bag mounted beneath said handle and having an inlet adjacent its upper end connected with a downwardly facing outlet opening from the upper end of said conduit, said bag also having a relatively large open mouth at its lower end, a rigid annular supporting member depending from said casing adjacent said exhaust outlet and detachably supporting said bag mouth in extended position, a collecting receptacle detachably supported with its open end communicating with said bag mouth, and an elongated frame hinged to said supporting member and, extending lengthwise beneath said bag, adapted for detachably mounting at its free end adjacent the upper end of said handle.

3. In a suction cleaner, the combination of a carriage, a fan casing rotatively mounted on said carriage to turn about a horizontal axis and having a tangentially opening exhaust outlet, a hollow handle connected with said casing at said outlet and forming an exhaust conduit, an elongated filter bag mounted beneath said handle and having an inlet at its upper end adapted to be connected with the upper end of said conduit and a relatively large open mouth at its lower end, a rigid annular supporting member depending from said casing adjacent said exhaust outlet and detachably supporting said bag mouth in extended position, a dirt collecting receptacle detachably supported against said bag mouth supporting member, a shield mounted on said handle and extending laterally therefrom to cover the uppermost exposed side and end of said bag, and an elongated frame member hinged to the under side of said bag mouth supporting member and extending lengthwise beneath said bag, and means for detachably anchoring the free end of said frame to the upper edge of said shield.

4. In a suction cleaner, the combination of a fan casing having an exhaust outlet, a hollow handle connected with said outlet and forming an exhaust passage, a filter bag mounted beneath said handle and having an inlet adjacent its upper end connected with an outlet opening from said exhaust passage, a supporting member adjacent the lower end of said handle for detachably supporting the adjacent portion of said filter bag and a frame having hinged connection with said supporting member and extending lengthwise of said handle below said bag.

5. In a suction cleaner of the type embodying a pivoted handle and a dust bag supported thereby and adjacent thereto, a bag-protecting frame pivotally mounted relative to said handle at its lower end and extended beneath and in contact with said bag, and manually operable means releasably securing said frame relative to said handle at its upper end.

6. In a suction cleaner of the type embodying a pivoted handle and a dust bag supported thereby and adjacent thereto, a bag-protecting frame comprising parallel rods interconnected by a rod webbing and joined at their upper ends, means pivotally mounting the lower end of said frame relative to said handle, and manually operable means releasably securing said frame relative to said handle at its upper end.

7. In a suction cleaner, the combination of a fan casing having an exhaust outlet, a hollow handle connected with said outlet and forming an exhaust passage, a filter bag mounted beneath said handle and interiorly connected thereto, a bag-protecting member carried by said handle contoured to lie above said bag, and a bag-restraining member carried by said handle adjacent the under side of said bag to effect the expansion of said bag against said bag-protecting member and to reduce the thickness of said bag when expanded.

8. In a suction cleaner, the combination of a fan casing having an exhaust outlet, a hollow handle connected with said outlet and forming an exhaust passage, a filter bag mounted beneath said handle and interiorly connected thereto, a bag-protecting shield carried by said handle and contoured to overlie the upper side of said bag and to extend along the sides thereof, and a bag-restraining member pivotally mounted relative to said handle at the lower end of said bag and extended along the under side thereof parallel to said handle to force said bag when expanded against said shield and to reduce its thickness below said handle, and manually operable means releasably securing the upper end of said bag-restraining member relative to said handle.

9. A neckless dirt-filtering bag for a suction cleaner comprising an elongated air-pervious cylindrical body formed with an intake opening for dirt-laden air adjacent the top end of said body and lying flat in the body side wall, the plane of said intake opening being substantially parallel to the major axis of the bag, and with a normally open exhaust opening for falling dirt at the opposite or bottom end of said body, the plane of said exhaust opening being substantially at right angles to said major axis.

10. In a suction cleaner an exhaust conduit for dirt-laden air, an air pervious dust bag having an inlet opening at its upper end connected to said conduit, said inlet opening being formed in a side wall and so positioned and arranged that entering dirt-laden air initially travels transversely of the major axis of the air-pervious bag, said bag being formed at its lower end with an exhaust outlet transverse to said axis, and a dirt receptacle removably attached to the exhaust outlet of the bag to receive particles of dirt which drop from the bag through said outlet.

DONALD G. SMELLIE.